Sept. 4, 1928.　　　　　D. S. JACOBUS　　　　　1,682,843
WATER LEVEL INDICATOR
Filed June 17, 1924
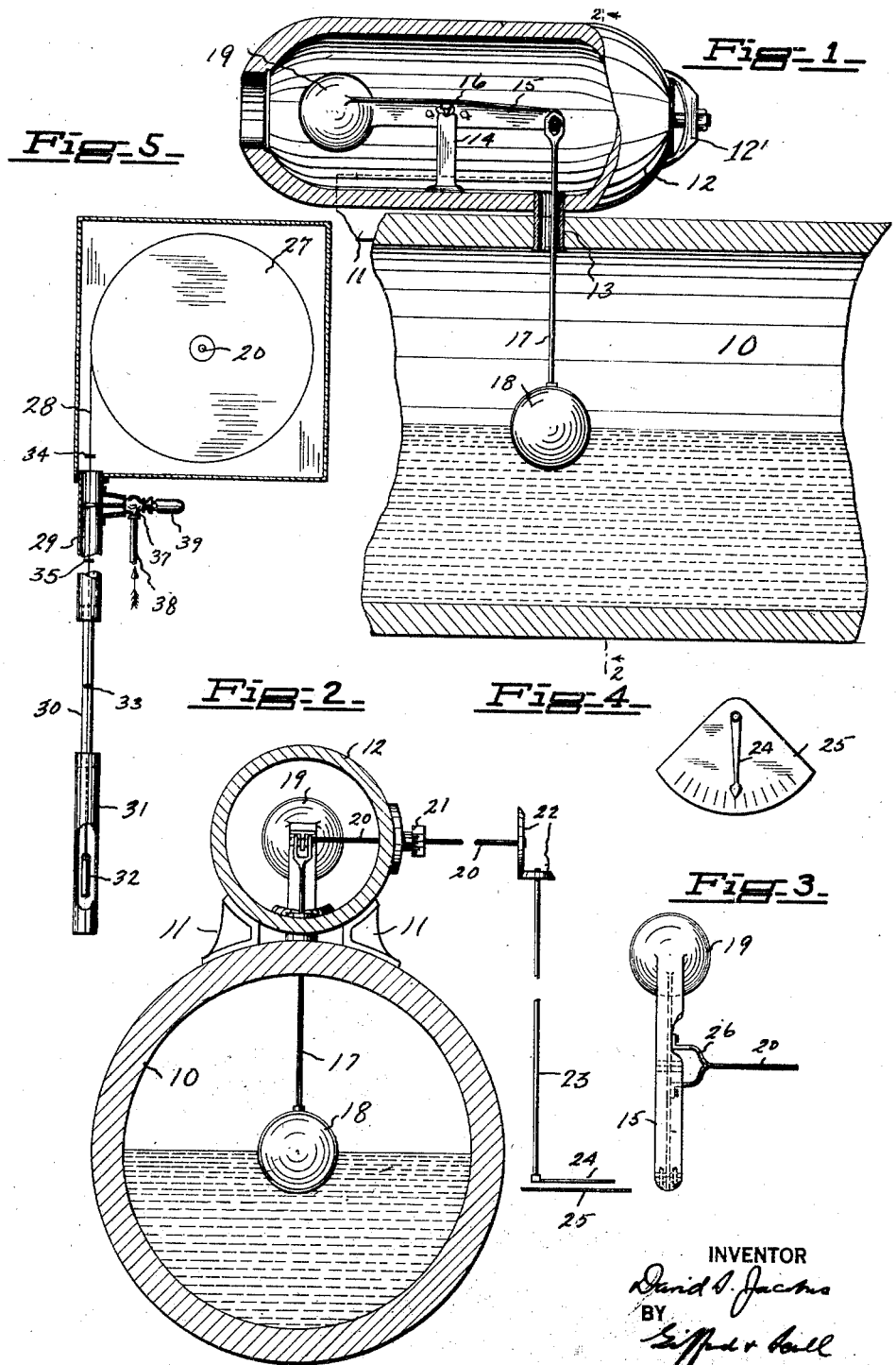

Patented Sept. 4, 1928.

1,682,843

UNITED STATES PATENT OFFICE.

DAVID S. JACOBUS, OF JERSEY CITY, NEW JERSEY, ASSIGNOR TO THE BABCOCK & WILCOX COMPANY, OF BAYONNE, NEW JERSEY, A CORPORATION OF NEW JERSEY.

WATER-LEVEL INDICATOR.

Application filed June 17, 1924. Serial No. 720,503.

My present invention relates to water level indicators particularly those adapted for use in connection with high pressure steam boilers.

As is well known, great difficulty has heretofore been experienced with the ordinary gauge glass to indicate water levels when high boiler pressures are involved. On the other hand, any float-operated indicator in which the float is of the usual hollow ball type, is liable to become inoperative because of the liability of the float leaking and thus destroying its functioning.

By my present invention, I provide a water level indicator which is free from the usual objections and which can be safely used with high pressure steam boilers.

Referring to the drawings in which I have shown an illustrative embodiment of my invention as it would be applied to a high pressure steam boiler having steam and water drums, Fig. 1 is a view of such illustrative embodiment with some of the parts broken away and removed to better illustrate the construction; Fig. 2 is a section on the line 2—2 of Fig. 1; Fig. 3 is a plan view of the balance lever of Fig. 1; Fig. 4 is a plan view of a part of Fig. 2, and Fig. 5 is a side view of a modification.

Like reference characters indicate like parts in the several views.

In high pressure steam boilers, it is usual, if a steam and water drum is used, to make such drum of relatively small diameter so as to give it the required strength without undue thickness of metal, and a part of such a drum is illustrated at 10, the drum here shown having supported thereon by means of the supports 11, an auxiliary drum 12 with a nipple 13 expanded into the top of the drum 10 and the bottom of the drum 12 forming a communication between the steam space of the drum 10 and the auxiliary drum 12.

The auxiliary drum 12 may be made of any desired shape, but preferably, in the form of Fig. 1, with its ends drawn down and closed, with their internally seated closures held by external yokes. In Fig. 1, the yoke 12' is shown at the right-hand end of the drum 12 and removed at the left-hand end. These closures are made large enough to permit the insertion of the float mechanism to be hereinafter described, and to afford easy access to it without permitting leakage of steam.

A support 14 within the drum 12 carries a balance lever 15, supported on knife edges 16. One end of the lever 15 extends over the nipple 13 and from this end, also preferably supported on knife edges, is a support rod 17 extending down through the nipple 13 and connected to a solid metallic float 18 positioned at or near the normal water level in the drum 10. At the other end of the lever 15 is a balance weight 19.

Connected to the lever 15 by the forked construction 26 shown in Fig. 3, is a shaft 20 having its axis in the axis of the fulcrum of the lever 15, the shaft 20 extending from a gland 21, as shown in Fig. 2, and having at its outer end, in the form illustrated in that figure, a pair of bevel gears 22, one of which is connected to a vertical shaft 23 having a pointer 24 swinging over an index plate 25.

With the arrangement just described, it will be obvious that as the water level in the drum 10 rises and falls, the float 18 will similarly be raised and lowered, the balance weight 19 being designed so that the buoyancy of the water around float 18 is necessary in order to overcome the difference in weight between the floats 18 and the balance weight 19.

By having a solid metallic float 18, it is obvious that there will be no joints or the like to open up and permit the float to fill with water and thus destroy the operativeness of the indicator. On the other hand, by having this relatively heavy mass for the float, it is necessary to provide an almost equally heavy mass 19, so that the total weight on the fulcrum of the lever 15 is relatively great. Such an arrangement, if provided with the ordinary bearings, might be so sluggish as not to respond quickly to changes in the water level, and to overcome this, I have provided the knife bearing 16 so that the lever 15 may be turned without effort, thus permitting slight changes in the water level to move the relatively heavy masses of the float 18 and the balance weight 19. The motion of the lever 15 on its fulcrum will rotate the shaft 20 and thus turn the pointer 24 to the appropriate point for the water level existing at that time in the drum 10. By providing the forked arrangement 26, by which the shaft 20 is attached to the lever 15, I provide an arrangement by which the knife edge fulcrum can be provided between the support 14 and the lever 15 without interference between the knife edge and the connections to the indicating shaft 20.

Instead of the index device of Figs. 2 and 4, I may use the device shown in Fig. 5, in which a wheel 27 is attached to the end of the shaft 20, the wheel 27 having attached to it and passing over a portion of the periphery thereof, a wire 28 extending down through a metal tube 29, a glass tube 30 and a metal tube 31 and having a weight 32 attached to the lower end thereof. An indicating device 33 is attached to the wire 28 so as to be positioned approximately at the center of the glass 30 when the water level is normal. Obviously, as the shaft 20 is turned, the wheel 27 is turned with it, which causes the wire 28 to rise or fall and to carry the indicator 33 up and down inside of the glass 30 to indicate the water level.

If desired, a pair of members 34, 35 may be attached to the wire 28 so as to contact with a valve arm 36 of a valve 37, in a steam pipe 38, to admit steam to the whistle 39 to warn the operator when the water level is below or above predetermined levels, the contact of either of the members 34, 35 with the arm 36 opening the valve 37 to admit steam to the whistle 39.

While many features of my invention might be applied directly to a water level indicator, the operating parts of which would be entirely within the drum 10, I prefer to use the arrangement shown in Fig. 1, in order that the operating parts may be in a separate drum so as to make access thereto possible without emptying the drum 10, and also so that the float 18 may be placed in any desired position lengthwise of the drum 10 and still be accessible, and also so that the shaft 20 may pass through the walls of the drum containing the lever 15 normal to the surface of such walls. It will be obvious that if the lever 15 were in the upper part of the drum 10, for instance, the shaft 20 would not be normal to the surface of the walls of the drum 10 and this would require a fitting difficult to make and attach.

It will be understood that the embodiment of my invention may be widely varied and that some of the features thereof may be used independently of other features.

I claim:

1. A water level indicator for a steam boiler having a steam and water drum, said indicator comprising a chamber, a steam connection between said drum and chamber, a balance lever in said chamber, a float in said drum and positioned in the water therein, and a suspension member connecting said lever and said float and extending freely through the steam connection between the drum and said chamber.

2. A water level indicator for a steam boiler having a steam and water drum, said indicator comprising a chamber, a steam connection between said drum and chamber, a balance lever in said chamber, a solid metallic float in said drum and positioned in the water therein, a suspension member connecting said lever and said float and extending freely through the steam connection between the drum and said chamber, and a balance weight on said lever.

3. A water level indicator for a steam boiler having a steam and water drum, said indicator comprising a chamber, a steam connection between said drum and chamber, a balance lever pivoted in said chamber, a solid metallic float in said drum and positioned in the water therein, a suspension member connecting one end of said lever and said float and extending through the steam connection between the drum and said chamber, a balance weight on the other end of said lever, and a level gauge exterior to said chamber and means for connecting said gauge and said lever including a shaft connected to the lever and extending through the wall of said chamber.

4. A water level indicator for a steam boiler having a steam and water drum, said indicator comprising an auxiliary drum of relatively small diameter, a lever pivoted in said auxiliary drum and having the axis of its fulcrum at right-angles to the axis of said drum with said axes in substantially the same plane, a float in the steam and water drum and in the water therein, a steam connection between said drums, a suspensinon member extending through said steam connection and connecting said float with one end of said lever, a level gauge exterior of said drums and a shaft extending through the wall of said auxiliary drum and connecting said gauge and said lever.

5. A water level indicator for a steam boiler having a steam and water drum, said indicator comprising an auxiliary drum of relatively small diameter, a lever pivoted in said auxiliary drum and having the axis of its fulcrum at right-angles to the axis of said drum with said axes in substantially the same plane, a solid metallic float in the steam and water drum and in the water therein, a steam connection between said drums, a suspension member extending through said steam connection and connecting said float with one end of said lever, a level gauge exterior of said drums and a shaft extending through the wall of said auxiliary drum and connecting said gauge and said lever, and a balance weight attached to the other end of said lever.

6. A water level indicator for a steam boiler having a steam and water drum, said indicator comprising an auxiliary drum of relatively small diameter, a lever pivotally mounted intermediate its ends in said auxiliary drum and having the axis of its fulcrum at right-angles to the axis of said auxiliary drum with said axes in substantially the same plane, a support for said lever in said auxiliary drum, said lever being supported on said support on a knife edge bearing, a solid metallic float in the steam and water drum and in the water therein, a steam connection between said drums, a suspension member extending through said steam connection and connecting said float to one end of said lever, a level gauge exterior of said drums and a shaft extending through the wall of said auxiliary drum and connecting said gauge and said lever, and a balance weight on the other end of said lever.

7. In a water level indicator for steam boilers, a steam and water drum, an auxiliary drum mounted on top thereof, means connecting said auxiliary drum to the steam space of the steam and water drum, a lever in the auxiliary drum having a counterweight, and a vertical connecting member on said lever and extending through said connection to a float in said steam and water drum.

8. In a water level indicator for steam boilers, a steam and water drum, an auxiliary drum mounted on top thereof, means connecting said auxiliary drum to the steam space of the steam and water drum, a lever in the axiliary drum having a counterweight, a vertical connecting member on said lever and extending through said connection to a float in said steam and water drum, a continuous indicator, and connections whereby said indicator is operated by movement of said lever.

DAVID S. JACOBUS.